(12) United States Patent
Li

(10) Patent No.: US 11,824,470 B2
(45) Date of Patent: Nov. 21, 2023

(54) METHOD OF DETERMINING AN INITIAL ROTOR POSITION FOR A SYNCHRONOUS MOTOR AND A CONTROLLER THEREFOR

(71) Applicant: Kinetic Technologies International Holdings LP, Toronto (CA)

(72) Inventor: Kwei Chung Li, Kowloon (HK)

(73) Assignee: Kinetic Technologies International Holdings LP, Toronto (CA)

( * ) Notice: Subject to any disclaimer, the term of this patent is extended or adjusted under 35 U.S.C. 154(b) by 0 days.

(21) Appl. No.: 17/462,721

(22) Filed: Aug. 31, 2021

(65) Prior Publication Data
US 2023/0068845 A1 Mar. 2, 2023

(51) Int. Cl.
*H02P 21/18* (2016.01)
*H02P 6/185* (2016.01)
(Continued)

(52) U.S. Cl.
CPC .............. *H02P 21/18* (2016.02); *H02P 6/185* (2013.01); *H02P 6/20* (2013.01); *H02P 21/32* (2016.02);
(Continued)

(58) Field of Classification Search
CPC .. H02P 21/18; H02P 6/185; H02P 6/20; H02P 21/32; H02P 2203/03; H02P 2207/05
See application file for complete search history.

(56) References Cited

U.S. PATENT DOCUMENTS

| 5,841,252 | A  | 11/1998 | Dunfield |
| 2010/0026223 | A1 | 2/2010 | Liu et al. |

(Continued)

FOREIGN PATENT DOCUMENTS

| CN | 1808052 A | 7/2006 |
| CN | 108322105 A | 7/2018 |

(Continued)

OTHER PUBLICATIONS

PCT International Search Report and the Written Opinion dated Oct. 10, 2022, issued in related International Application No. PCT/CN2022/106534 (8 pages).

(Continued)

*Primary Examiner* — Muhammad S Islam
*Assistant Examiner* — Bradley R Brown
(74) *Attorney, Agent, or Firm* — Sheppard Mullin Richter & Hampton LLP

(57) ABSTRACT

Described is a method of determining an initial rotor position on start-up of a synchronous motor. The method comprises applying at each of a plurality of pre-set motor angles a pair of voltage vector pulses, the pair of voltage vector pulses comprising a first and second pulses, each having the same amplitude but opposite polarities, the second pulse being applied immediately or near immediately after the first pulse. The method includes determining the stator current responses to said pairs of applied voltage vector pulses at said plurality of pre-set motor angles. Then, the initial rotor position can be determined from either of a stator angle corresponding to a pair of vector voltage pulses resulting in (a) a largest sum of stator currents or (b) where the sum of stator currents changes from a negative to a positive motor angle.

18 Claims, 11 Drawing Sheets

(51) Int. Cl.
*H02P 6/20* (2016.01)
*H02P 21/32* (2016.01)

(52) U.S. Cl.
CPC ...... *H02P 2203/03* (2013.01); *H02P 2207/05* (2013.01)

(56) References Cited

U.S. PATENT DOCUMENTS

| | | | |
|---|---|---|---|
| 2018/0054147 A1* | 2/2018 | Frick | H02P 21/18 |
| 2018/0131305 A1* | 5/2018 | Wang | H02P 21/0021 |
| 2018/0198397 A1 | 7/2018 | Thomas et al. | |

FOREIGN PATENT DOCUMENTS

| | | |
|---|---|---|
| CN | 109873589 B | 7/2020 |
| CN | 109302111 B | 9/2020 |
| CN | 211429147 U | 9/2020 |
| CN | 110855207 B | 10/2020 |
| CN | 109660168 B | 11/2020 |
| JP | 2001-204191 A | 7/2001 |
| JP | 2001204191 A * | 7/2001 |
| TW | 201509115 A | 3/2015 |

OTHER PUBLICATIONS

Zambada, Jorge, "Sensorless Field Oriented Control of PMSM Motors", AN1078, Microchip Technology Inc., 2007.

"Sensorless PMSM Field-Oriented Control" DRM148, Freescale Semiconductor, Inc., 2016.

Wei Xu et al., "Improved Rotor Flux Observer for Sensorless Control of PMSM With Adaptive Harmonic Elimination and Phase Compensation", CES Transactions, vol. 3, Jun. 2019.

Yan-Chuan et al., "A New Sensorless Starting Method for Brushless DC Motors without Reverse Rotation", IEEE Power Electronics Specialists Conference, pp. 619-624, Jun. 2007.

Search Report dated Mar. 27, 2023, issued in related Taiwan Application No. 111130666 (3 pages).

* cited by examiner

Motor Angle

| Stator Voltage Angle | 0 | 30 | 90 | 150 | 240 | 270 |
|---|---|---|---|---|---|---|
| 0 | -0.16 | -0.41 | -0.35 | -0.22 | 0.1 | 0.32 |
| 30 | 0.14 | -0.07 | -0.43 | -0.25 | 0.08 | 0.26 |
| 60 | 0.28 | 0.15 | -0.26 | -0.18 | 0.02 | 0.21 |
| 90 | 0.41 | 0.3 | -0.07 | -0.31 | -0.12 | 0.11 |
| 120 | 0.28 | 0.37 | 0.1 | -0.15 | -0.17 | 0.02 |
| 150 | 0.13 | 0.36 | 0.1 | -0.07 | -0.43 | -0.19 |
| 180 | -0.09 | 0.08 | 0.26 | 0.03 | -0.43 | -0.35 |
| 210 | -0.24 | -0.12 | 0.21 | 0.09 | -0.24 | -0.5 |
| 240 | -0.28 | -0.15 | 0.17 | 0.33 | -0.03 | -0.33 |
| 270 | -0.33 | -0.19 | 0.13 | 0.30 | 0.16 | -0.02 |
| 300 | -0.17 | -0.19 | 0.07 | 0.26 | 0.41 | 0.19 |
| 330 | -0.05 | -0.31 | -0.04 | 0.13 | 0.5 | 0.25 |

Fig. 9

METHOD OF DETERMINING AN INITIAL ROTOR POSITION FOR A SYNCHRONOUS MOTOR AND A CONTROLLER THEREFOR

FIELD OF THE INVENTION

The invention relates to a method of determining an initial rotor position for a synchronous motor and a controller therefor. The method relates particularly, but not inclusively to a method of determining an initial rotor position for a permanent magnet synchronous motor (PMSM) having a sensorless closed-loop control system for synchronous operation.

BACKGROUND OF THE INVENTION

The most common types of e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors, BLDC motors can be considered as synchronous DC motors which use a controller haying a power stage including a DC voltage supply, suitably convened, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

A problem may, however, be encountered on start-up of the synchronous motor in that a minimum operating speed of the rotor is required to obtain a level of the estimated back-emf necessary for closed-loop motor control for synchronous operation. In other words, when the motor is at standstill or low speed, the measured signal is too small to make precise position estimation.

The commonest solution to the problem is the open-loop start-up method by injecting current which is ramped up from low to high frequency. However, with an unknown initial rotor position and combined with possible large static friction, the motor may start to rotate with temporary rotation reversal or even unable to start-up. Another solution to the problem is to start the motor from a pre-determined rotor position. The procedure is to excite two phases of the three-phase windings for a pre-set time. The permanent magnet rotor will then rotate to align with the direction corresponding to the induced magnetic field. However, during the alignment process there may be a reversal of rotation or even temporary vibrations, and this is unacceptable for some motor applications.

To solve the above issues, the alignment process is improved by various initial rotor position estimation techniques. Most initial rotor estimation methods are based on the saturation effect of the stator iron core due to the permanent magnet of the rotor. One such method of identifying the initial position comprises comparing the vector d-axis current after applying voltage pulses. This method detects the initial rotor position by the time periods of discharge of stator windings, which are excited before discharge. Another initial position detection method combines an iterative sequence of voltage pulses with a fuzzy logic processing of the current responses and phase currents derivation based on the DC-link current measurements. This procedure is based on the large-and-small relationship between the maximum line-to-line emfs (electromotive forces) induced in the stator windings when two windings are excited by the DC voltage source of the inverter. However, these methods have drawbacks being complicated to implement or requiring measurement of the three-phase currents and voltages.

As disclosed in the publication entitled "A New Sensorless Starting Method for Brushless DC Motors without Reverse Rotation" authored by Yan-Chuan and Ying-Yu Tzou, published in IEEE Power Electronics Specialists Conference, pages 619-624, on 17-21 Jun. 2007, the content of which is incorporated herein by way of reference, a solution to the problem is to detect variations of the DC-link current responses by the injection of applied voltage vectors. The measured DC-link current is a function of rotor position due to its magnetic field distribution.

One problem encountered with this method is that it is necessary to drive the motor stator coils into saturation. This requires large currents to be applied in short delivery times which results in significant noise (sound) or chatter of the motor. The voltage vector pulses are applied in pairs separated by 180°, e.g. [1, 180], [30, 210, [60, 240], etc. This is because the large voltage vector pulses needed for this method of determining the initial rotor position are driving the motor such that they rock the rotor, i.e., cause the rotor to rotate backward and forward, so that the rotor may keep its original position. However, the amount of rotation depends on the amount of applied voltage and the time interval between the pair of motor angle separated voltage pulses. The rocking of the rotor results in back-emf being induced which adversely affects the motor angle position determination. To improve the accuracy of motor angle detection, larger voltage vector pulses may be applied, but these require a longer rest time between pulses for the motor current to degrade to zero and, in any event, cause even larger back-emf to be induced thereby causing a greater adverse effect on the accuracy of the motor angle position determination.

Among other things, what is therefore desired is an improved method of determining at initial rotor position for a synchronous motor.

Objects of the Invention

An object of the invention is to mitigate or obviate to some degree one or more problems associated with known methods of determining an initial rotor position for a synchronous motor.

The above object is met by the combination of features of the main claims; the sub-claims disclose further advantageous embodiments of the invention.

Another object of the invention is to provide an improved method of determining an initial rotor position for a PMSM having a sensorless closed-loop control system for synchronous operation.

Another object of the invention is to provide an improved method of starting a synchronous motor having a sensorless closed-loop control system for synchronous operation.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of determining an initial rotor position on start-up of a synchronous motor. The method comprises applying at each of a plurality of pre-set motor angles a pair of voltage vector pulses, the pair of voltage vector pulses comprising a first and second pulses, each having the same amplitude but opposite polarities, the second pulse being applied immediately or near immediately after the first pulse. The method includes determining the stator current responses to said pairs of applied voltage vector pulses at said plurality of pre-set motor angles. Then, the initial rotor position can be determined from either of a stator angle corresponding to a pair of vector voltage pulses resulting in (a) a largest sum of stator currents or (b) where the sum of stator currents changes from a negative to a positive motor angle.

In a second main aspect, the invention provides a closed-loop method of starting a synchronous motor having a permanent magnet rotor, the method comprising the steps of applying at each of a plurality of pre-set motor angles of the synchronous motor a pair of voltage vector pulses, the pair of voltage vector pulses comprising a first pulse and a second pulse, each having the same amplitude but opposite polarities, the second voltage vector pulse being applied immediately or near immediately after the first voltage vector pulse is applied; determining the current responses to said pairs of applied voltage vector pulses at said plurality of pre-set motor angles; and (a) determining as the initial rotor position a stator angle corresponding to a pair of vector voltage pulses resulting in a largest sum of stator currents; or (b) determining as the initial rotor position a stator angle corresponding to a pair of vector voltage pulses where the sum of stator currents changes from a negative to a positive motor angle; switching-over control of the motor to a closed-loop synchronous operation motor control algorithm once the initial rotor position has been determined.

In a third main aspect, the invention provides a closed-loop controller for a motor, said controller comprising a non-transitory computer-readable medium storing machine-readable instructions and a processor, wherein, when the machine-readable instructions are executed by said processor, they configure the controller to start a synchronous motor having a permanent magnet rotor and stator windings in accordance with second main aspect of the invention.

In a fourth main aspect, the invention provides a synchronous motor including a closed loop controller according to the third main aspect of the invention.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 9 provides a chart of stator voltage angle versus motor angle for the DC-link current response after application of the pairs of excitation voltage vector pulses to the synchronous motor in accordance with the method of the invention;

DESCRIPTION OF PREFERRED EMBODIMENTS

Figure 1:
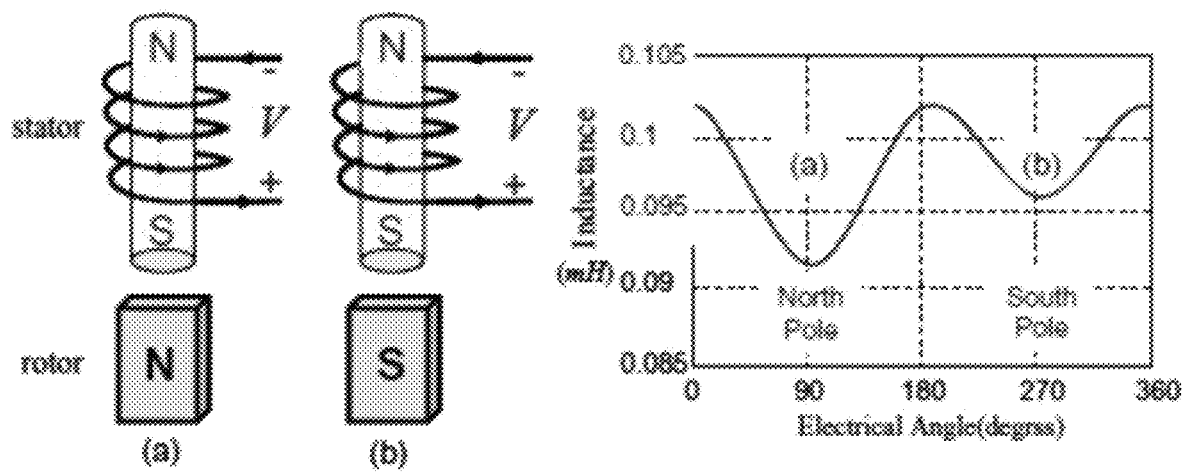
FIG. 1 illustrates stator inductance as a function of rotor flux and stator current for a conventional synchronous motor.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments It should be understood that the elements shown in the Figs. may be implemented in various forms of hardware, software, or combinations thereof These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the an that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 2:
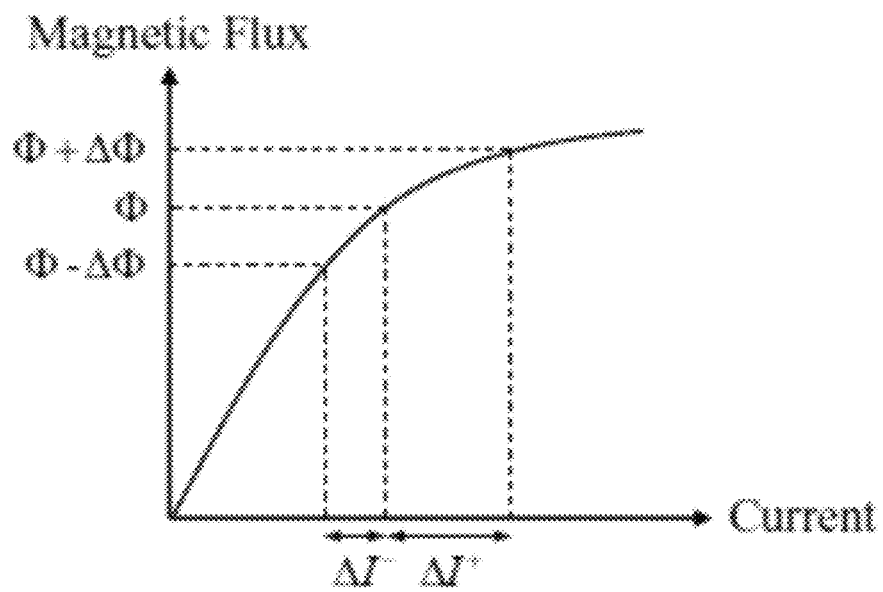
FIG. 2 is a graph of the non-linear magnetization characteristics of the stator core for a conventional synchronous motor.

In the aforementioned publication entitled "A New Sensorless Starting, Method for Brushless DC Motors without Reverse Rotation", the method of detecting or determining an initial position of the rotor uses the magnetic saturation effect of the stator iron core. In a PMSM motor, the rotor is a permanent magnet, and the inductance of the stator windings is a function of the rotor flux. When the stator windings are aligned with the north or south pole, the inductance will decrease due to the saturation effect. Moreover, when applying a DC voltage to the stator windings, this produces a current which induces a magnetic field aligned with the rotor field shown in FIG. 1(*a*). The magnetic flux will be increased and the stator saturation is increased, too. This results in a decreasing of the stator inductance and requires more current to generate the flux $\Delta\Phi$ as shown in FIG. 2. On the other hand, when the induced magnetic field is against the rotor field as shown in FIG. 1(*b*), the current decreases the magnetic flux by the coil, decreases stator saturation, and slightly increases the inductance compared with no stator current. Consequently, it is possible to identify the position of the magnetic pole from the variation in inductance.

Figure 3A:
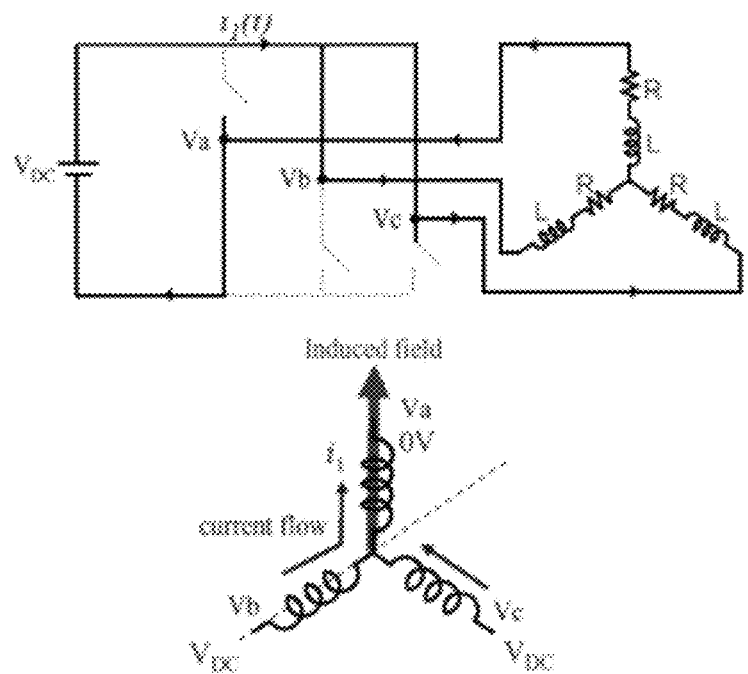
FIGS. 3A and 3B show current paths of two of a plurality of excitation configurations for a three-phase synchronous motor.
Figure 3B:
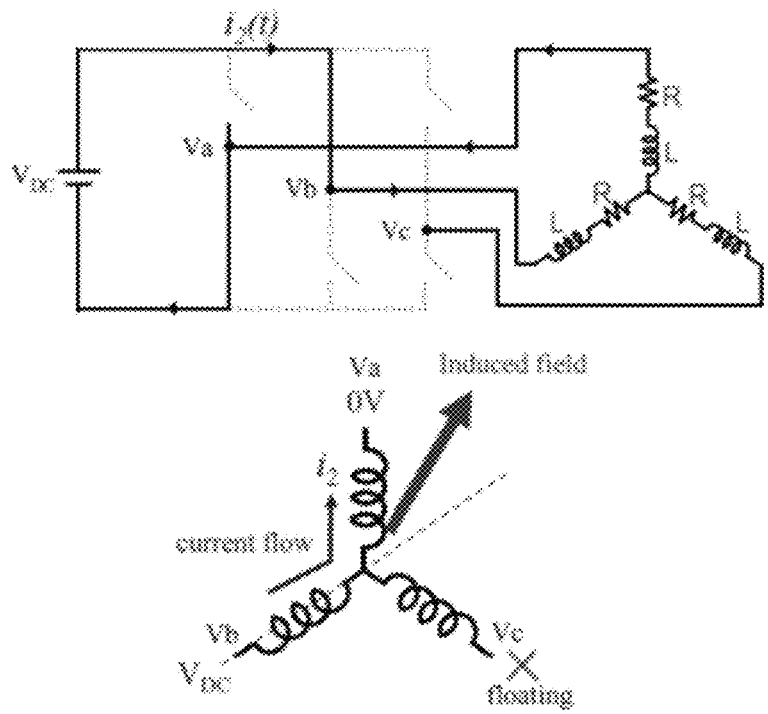

A PMSM motor can be modelled as a three-phase R-L circuit. When applying a DC voltage to the stator windings, the rising time of the current reflects the time constant of the stator windings, which is smaller for smaller inductance. Since the inductance in the windings is a function of rotor flux, the rotor position reflects the difference of time constant. Therefore, the relative position between a rotor magnet and a stator winding can be determined by the measurement of the current at the end of the voltage vector. FIGS. 3(*a*) and (*b*) shows two excitation configurations and the currents in the stator induce two different directions of magnetic field. When observing the peak value of DC-link current and $i_1$ and $i_2$ at the sampling, time, if $i_1$ is larger than $i_2$, then it can be deduced that the rotor field is near the field induced by $i_1$, because of the smaller stator inductance.

Vector control of a synchronous motor can be summarized as follows:

(i) The 3-phase stator currents are measured. These measurements typically provide values for $i_a$ and $i_b$, $i_c$ is calculated because $i_a$, $i_b$ and $i_c$ have the following relationship:

$$i_a + i_b + i_c = 0.$$

(ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.

The $I_d$ reference controls rotor magnetizing flux.
The $I_q$ reference controls the torque output of the motor.
The error signals are input to PI controllers.
The output of the controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

Figure 11:
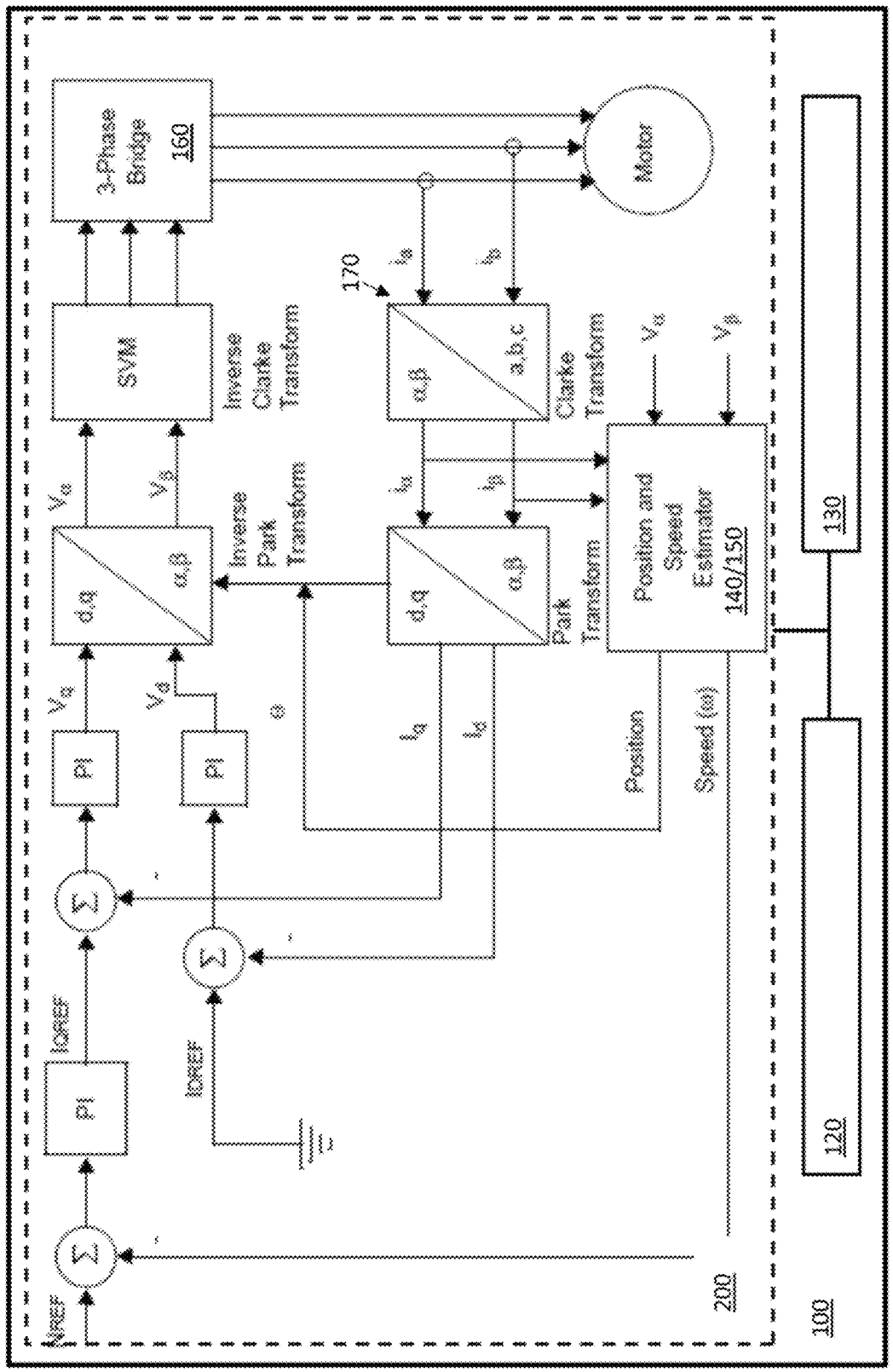
FIG. 11 is a detailed block schematic diagram of an embodiment of the closed-loop controller in accordance with the invention.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and venerating PWM is schematically illustrated in FIG. 11.

Figure 4:
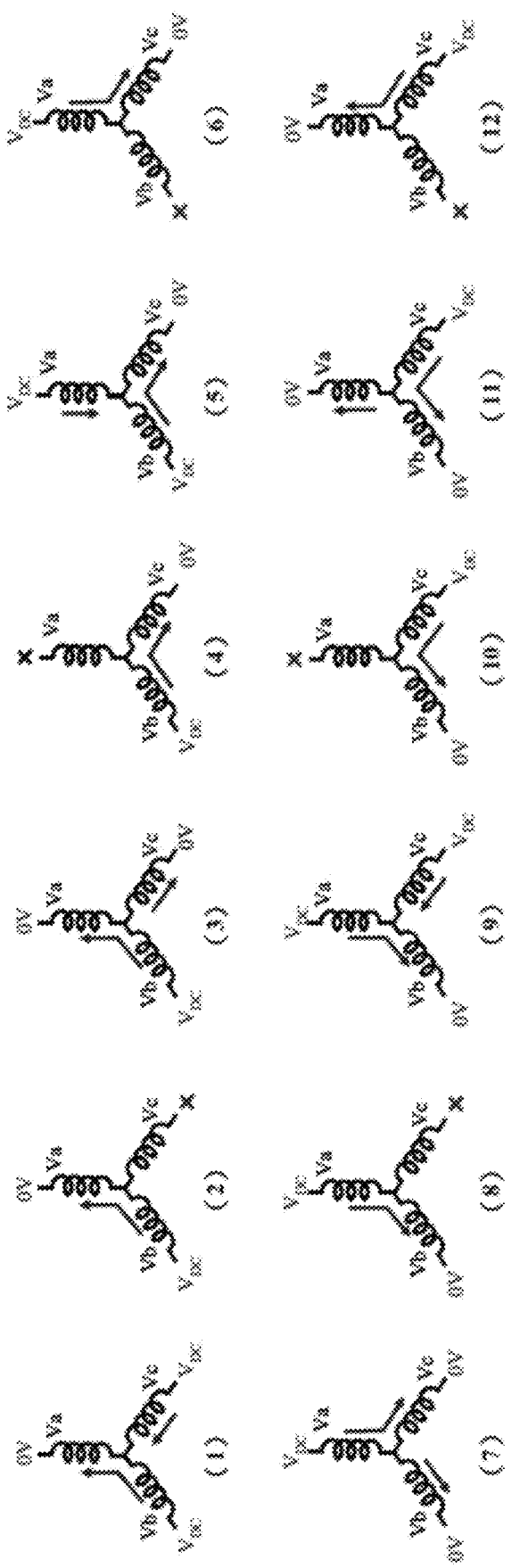
FIG. 4 shows all twelve excitation configurations fir a three-phase synchronous motor.
Figure 5:
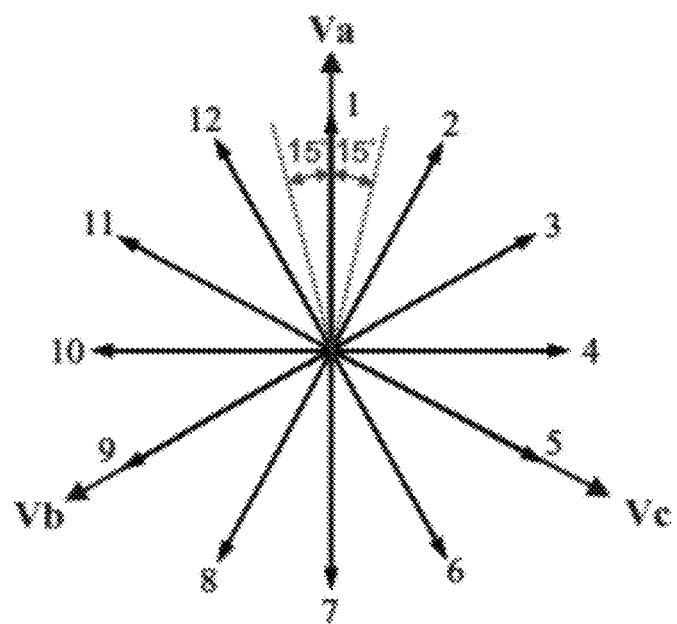
FIG. 5 illustrates the twelve voltage vectors corresponding to the twelve excitation configurations of FIG. 4.
Figure 6:
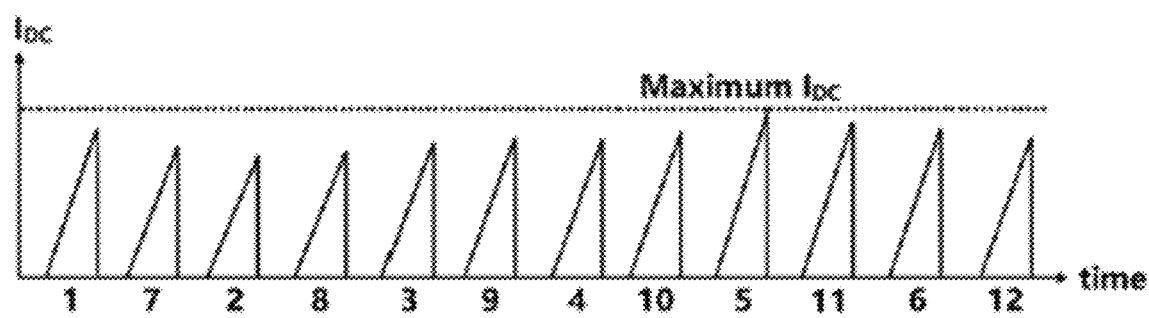
FIG. 6 shows the DC-link current response after application of twelve excitation voltage vector pulses to the conventional three-phase synchronous motor.

Based upon the principle mentioned above, there are twelve excitation configurations that can be applied for a three-phase motor as shown in FIG. 4. The twelve excitation configurations correspond to respective motor angles. The initial rotor position can be determined by comparing the peak amplitude of the twelve DC-link currents. FIG. 5 shows the twelve voltage vectors in the estimation process. The voltage vector with maximum value of the DC-link current occurs represents where the permanent magnetic pole is located. For example, FIG. 6 shows the DC-link current response after twelve excitation voltage vector pulses. There is a maximum peak current value for the excitation configuration in motor angle position (5) in FIG. 5. Therefore, the permanent magnetic pole is aligned with the magnetic field induced by the excitation configuration (5) in FIG. 5. According to the method, initial rotor position can be detected every 30 electrical degrees, which is of sufficient accuracy to start-up the motor without any temporary rotation reversal.

The initial rotor position estimation is based on the DC-link current response when the voltage vectors are applied, therefore the amplitude and the output time of the voltage vectors are important. However, we can determine only the output time of the voltage vectors because the amplitude is decided by the DC-link voltage, The configuration of the applied voltages is divided in two groups. One is shown in FIG. 4 comprising motor angles (1), (3), (5), (7), (9), (11), and the other is shown in FIG. 4 comprising motor angles (2), (4), (6), (8), (10), (12). The main differences between these groups are the equivalent resistance and inductance. For example, the equivalent resistance and inductance in FIG. 3($a$) are 1.5R and 1.5L, whereas they are 2R and 2L in FIG. 3($b$). To have an identical peak current at the end of the voltage vector, the turn-on time of the voltage vectors should be different. The current response $i_1(t)$ and $i_2(l)$ in FIGS. 4($a$) and 4($b$) can be expressed as:

$$i_1(t) = \frac{V_{DC}}{1.5R}\left(1 - e^{-\frac{R}{L}t_1}\right) \quad (1)$$

$$i_2(t) = \frac{V_{DC}}{2R}\left(1 - e^{-\frac{R}{L}t_2}\right) \quad (2)$$

where $t_1$ and $t_2$ are the turn-on time of the voltage vectors in FIGS. 3($a$) and ($b$) respectively. To equalize the peak current response, then:

$$i_1(t) = i_2(t) \quad (3)$$

Thus, we can obtain:

$$t_2 = -\frac{L}{R}\ln\left(\frac{4e^{-\frac{R}{L}t_1} - 1}{3}\right) \quad (4)$$

As shown in equation (4), the relationship between the output timing of the voltage vectors can therefore be determined.

The method of determining an initial position of a rotor in accordance with the invention builds on and modifies the above method disclosed in "A New Sensorless Starting Method for Brushless DC Motors without Reverse Rotation".

Figure 7:
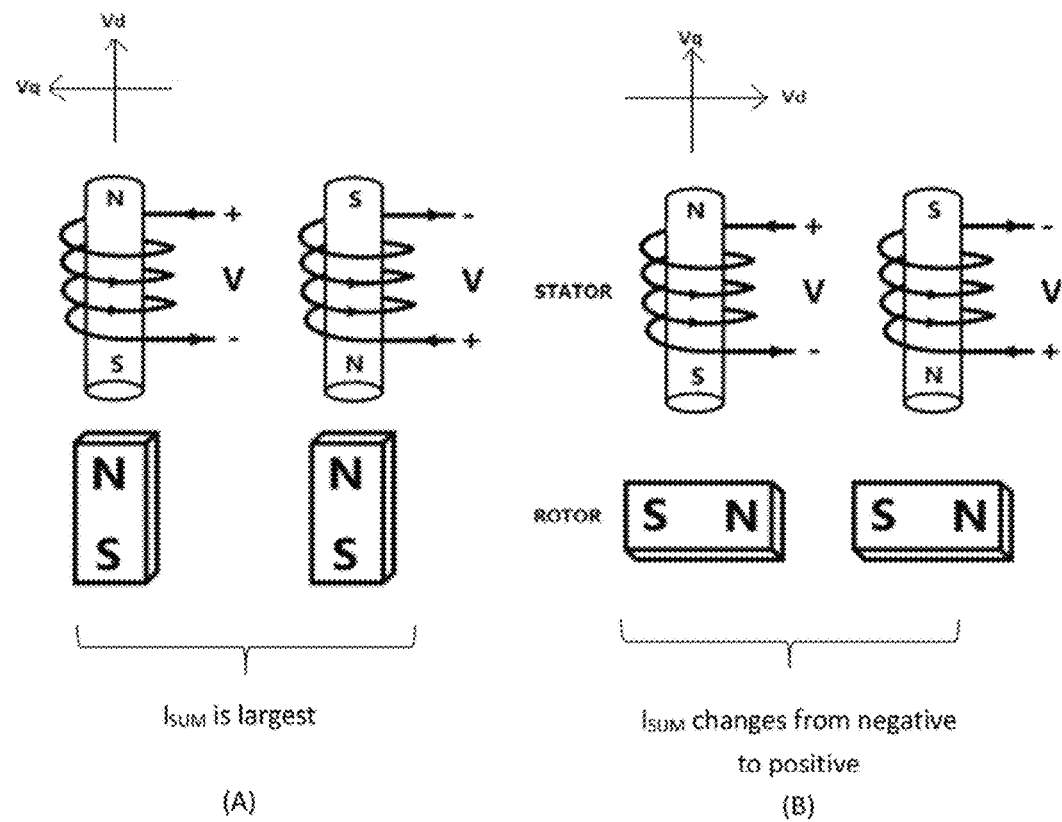
FIG. 7 illustrates stator inductance arrangements in a synchronous motor in accordance with the method of the invention.

FIG. 7 illustrates stator inductance arrangements in a synchronous motor in accordance with the method of the invention. This illustrates two methods of determining an initial rotor position from the DC-link current response when voltage vector pulses according to the invention are applied to the synchronous motor stator coils. One method denoted by (A) in FIG. 7 is based on a maximum value of the DC-link current response. Another method denoted by (B) in FIG. 7 is based on a change in polarity of the DC-link current response.

The method according to the invention comprises applying at each of a plurality of pre-set motor angles a pair of voltage vector pulses. For a three-phase synchronous motor, the plurality of pre-set motor angles comprise the motor angles corresponding to the twelve excitation configurations of FIG. 4 and the motor angles shown in FIG. 5.

A major departure from the method signified by the DC-link current response of FIG. 6 is that the method according to the invention utilizes pairs of voltage vector pulses of opposite polarity at each of the plurality of motor angles. Each pair of voltage vector pulses comprises a first, positive voltage vector pulse and a second, negative voltage vector pulse. This is the preferred order of the voltage vector pulses within each pair but, in some embodiments, the order may be reversed, namely a negative pulse followed by a positive pulse in each pair. Each pair of voltage vector pulses is selected as appropriate for a corresponding one of the plurality of motor angles and applied to only that corresponding motor angle. The amplitudes of the first and second voltage vector pulses are preferably substantially equal.

References herein to "rotor angle" are to be taken as references to "rotor position". References herein to "stator angle" are to be taken as references to "commutation angle".

After application of the pairs of opposite polarity voltage vector pulses to the plurality of motor angles, the method then determines the stator current responses as illustrated in FIG. 5. which shows the DC-link current response after application of the pairs of excitation voltage vector pulses to the synchronous motor in accordance with the method of the invention.

Figure 8:
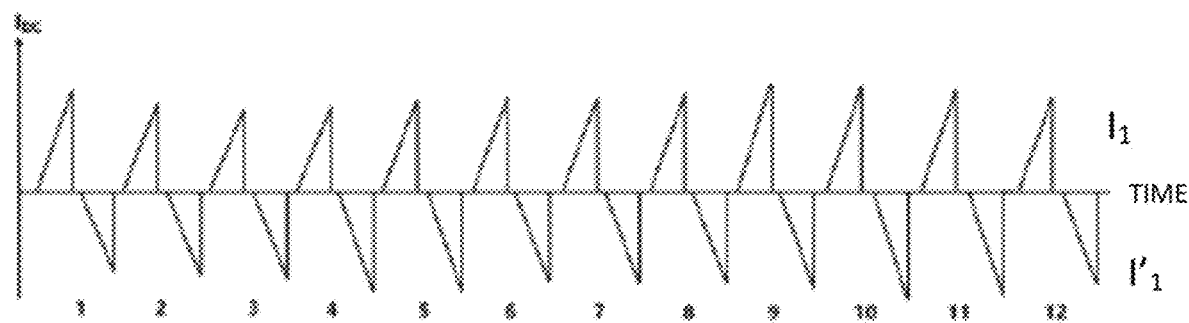
FIG. 8 shows the DC-link current response after application of the pairs of excitation voltage vector pulses to the synchronous motor in accordance with the method of the invention.

FIG. 8 illustrates that the pairs of opposite polarity voltage vector pulses have been applied to the plurality of motor angles in the clockwise rotational sequence of FIG. 5. However, in some embodiments, the pairs of opposite polarity voltage vector pulses may be applied to the plurality of motor angles in a sequence similar to that as shown, for example, in the known method of FIG. 6. The first pair of opposite polarity voltage vector pulses may therefore be applied to motor angle 1, the second pair of opposite polarity voltage vector pulses applied to motor angle 7, the third pair of opposite polarity voltage vector pulses applied to motor angle 2, the fourth pair applied to motor angle 8 and following pairs to [3, 9], [4, 10], [5, 11], [6, 12]. It will be seen that the motor angle 7 is displaced by 180° from motor angle 1, motor angle 2 displaced by 180° from motor angle 2 and so on.

Then, the initial rotor position can be determined from either of a stator angle corresponding to a pair of vector voltage pulses resulting in (A) a largest sum $I_{SUM}$ of stator currents or (B) where the sum $I_{SUM}$ of stator current changes from a negative to a positive motor angle. As can be seen in FIG. 8, each pair of applied opposite polarity voltage vector pulses results in two DC-link currents denoted as $I_1$ and $I'_1$ for each motor angle.

In the case of (A), the value of the stator currents $I_1$ and $I'_1$ for each motor angle is calculated according to $I_{SUM}=I_1+I'_1$. The motor angle in the DC-link current response having the largest value of $I_{SUM}$ is selected as the initial rotor position. The selected motor angle can then be input to a closed loop synchronous motor controller for start-up of the motor and subsequent synchronous operation. In the case of (A), it is preferred that the pairs of opposite polarity voltage vector pulses are applied to the motor vector d-axis. As the d-axis is in line with the rotor magnet by definition, in the case that the rotor magnet is aligned to the d-axis, the stator winding in d-axis shall experience maximum magnetic influence from the rotor magnet. Therefore, maximum $I_{SUM}$ will be detected.

In the case of (B), the value of the stator currents $I_1$ and $I'_1$ for each motor angle is also calculated according to $I_{SUM}=I_1+I'_1$. The motor angle in the DC-link current response where the sum of the stator currents changes from a negative to a positive motor angle is selected as the initial rotor position. The selected motor angle can then be input to a closed loop synchronous motor controller for start-up of the motor and subsequent synchronous operation. FIG. 9 provides a chart of stator voltage angle versus motor angle for the DC-link current response after application of the pairs of excitation voltage vector pulses to the synchronous motor in accordance with the method of the invention. In the case of (B), it is preferred that the pairs of opposite polarity voltage vector pulses are applied to the motor vector q-axis. As the q-axis is perpendicular to the rotor magnet by definition, in the case that the rotor magnet is aligned to the d-axis, the stator winding in the q-axis shall not experience any magnetic influence from the rotor magnet. Therefore, $I_1=-I'_1$ and $I_{SUM}=0$. As $I_{SUM}=0$ is in between the sum of the stator currents changes from a negative to a positive, the stator voltage angle with negative value next to the stator voltage angle with positive value in the chart of FIG. 9 is selected as the selected motor angle. One example is denoted by a dashed line box in the chart of FIG. 9.

The method of the present invention for both (A) and (B) provides a simple method of determining, the rotor initial position on start-up which can be implemented in an existing closed-loop motor controller without any circuit modification but by suitable modification of the controller's control instructions. The method also provides a simple method which requires no physical position sensors. The method also does not require any prior knowledge of motor parameters. The method also does not cause any rotor rotation so that the rotor retains its initial position. This greatly increases the accuracy of the determining, of the initial rotor position. The use of pairs of opposite polarity voltage vector pulses for each motor angle has the advantage of the second pulse cancelling or at least significantly reducing any back-emf caused by the first pulse. Consequently, the method can use low volage vector values compared to the voltage vector values of the known method as the method of the invention does not require the stator core to become very saturated. The values of the pairs of voltage vector pulses are therefore selected to not cause saturation of the stator. Furthermore, the method of the invention greatly reduces noise or chatter of the motor when determining the initial rotor position.

The method of determining the initial rotor position according to the invention can comprise a first part of a control algorithm for starting, and operating the synchronous motor. The invention therefore also relates to a method of and controller for starting a PMSM having a sensorless closed-loop controller for synchronous operation, but the method is applicable to any synchronous motor with a closed-loop controller for synchronous operation which utilizes the initial rotor position method as hereinbefore described.

One advantage of the invention is that it can be implemented on an existing closed-loop controller for synchronous operation without significant modification save for changes in the controller's control algorithm or algorithms. The closed-loop control algorithm in accordance with the invention can be implemented by software, firmware, hardware, or any combination of the foregoing. It may be embodied as an application specific integrated circuit or chip.

Figure 10:
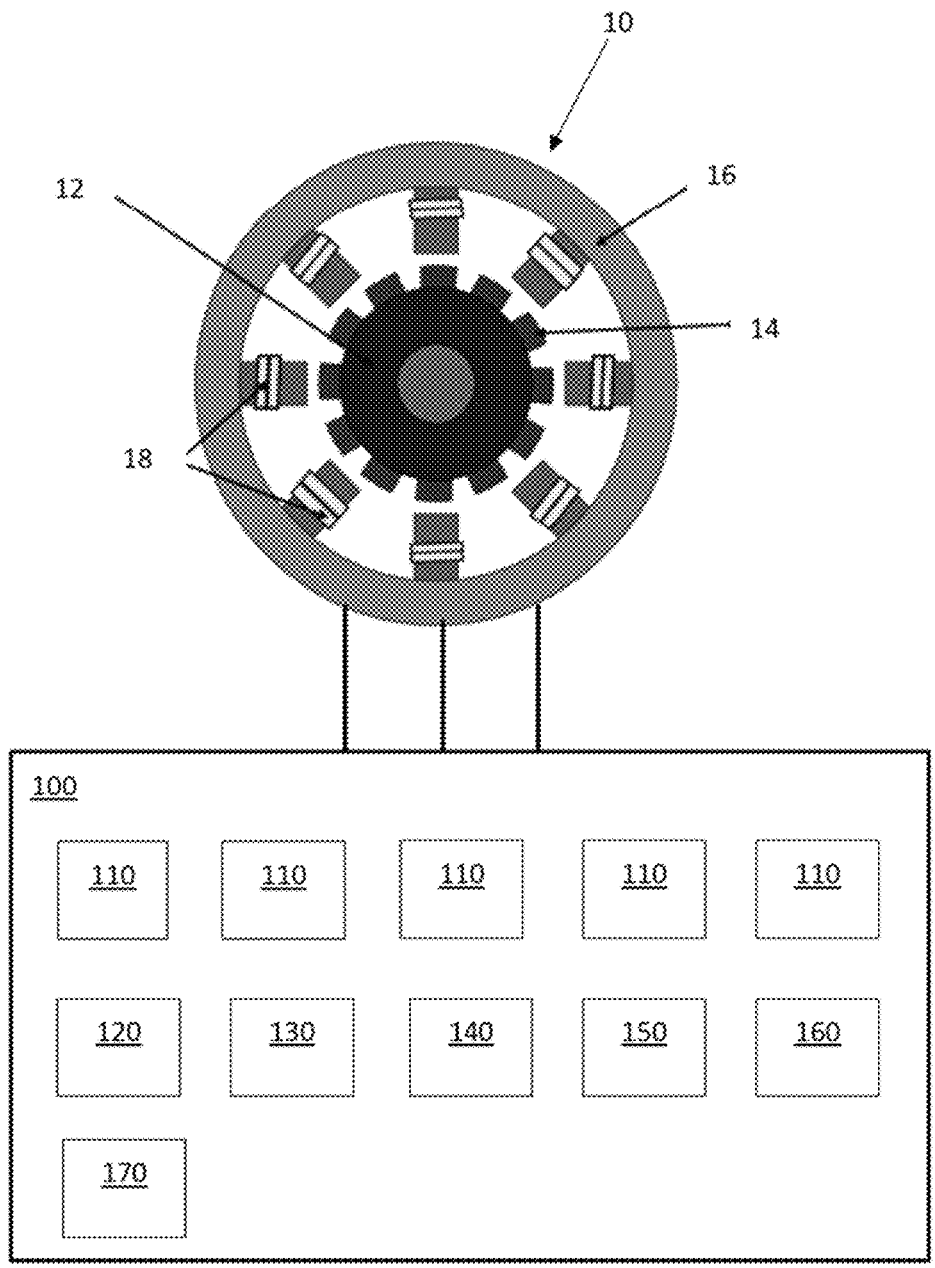
FIG. 10 is a block schematic diagram illustrating a synchronous motor with a closed-loop controller in accordance with the invention.

FIG. 10 shows an exemplary embodiment of an improved closed-loop controller 100 for a synchronous motor 10 in accordance with concepts of the present invention. The synchronous motor 10 has a permanent magnet rotor 12 with a plurality of permanent magnets 14 and a stator 16 with a plurality of stator windings 18. Whilst the synchronous motor 10 is shown with the stator 16 surrounding the rotor 12 in a conventional manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described in the publication entitled "Sensorless Field Oriented Control of PMSM Motors" authored by Jorge Zambada, published by Microchip Technology Inc. in 2007 as paper AN1078, the content of which is incorporated herein by way of reference, and as illustrated in FIG. 11 herein but modified as described herein in accordance with the concepts of the invention.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

In a broad aspect, the invention comprises using the closed-loop controller 100 of FIGS. 10 and 11, e.g., using the modified FOC controller 200 of FIG. 11, to implement the afore-described method of determining the rotor initial position. The closed-loop controller 100 may, as mentioned above, comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the afore-described method of determining the rotor initial position.

The closed-loop method of starting a synchronous motor comprises applying at each of the plurality of pre-set motor angles a pair of the opposite polarity voltage vector pulses with the second voltage vector pulse being applied immediately or near immediately after the first voltage vector pulse is applied. From this, the stator current responses to said pairs of applied voltage vector pulses at said plurality of pre-set motor angles is determined. Then, the initial rotor position is determined from: (a) a stator angle corresponding to a pair of vector voltage pulses resulting in a largest sum of stator currents; or (b) a stator angle corresponding to a pair of vector voltage pulses where the sum of stator current changes from a negative to a positive motor angle. The method then switches-over control of the motor to the closed-loop synchronous operation motor control algorithm once the initial rotor position has been determined.

The present invention therefore also seeks to supplement the known closed-loop method for operating a synchronous motor, especially a PMSM, by the afore-described method of determining the rotor initial position as an input to the closed-loop operation method on motor start-up.

The modified or reconfigured closed-loop controller 100/200 of FIGS. 10 and 11 is arranged to start the synchronous motor 10 having a permanent magnet rotor 12 and stator windings 18 by energizing the stator windings 18 using motor control signals based on or derived from the determined initial motor angle (initial rotor position) to thereby cause rotation of the rotor 12 from its initial standstill position without rotor reversal.

In one embodiment, however, after synchronous operation of the motor, an initial standstill rotor angle on initiation of the closed-loop start-up method may comprise a predetermined parked rotor angle. The predetermined parked rotor angle may be obtained when stopping the motor 10 after a preceding synchronous operation of the motor 10. The predetermined parked rotor angle may be obtained where, when the motor is stopped, the closed-loop controller 100/200 is configured to park the rotor 12 at a predetermined rotor angle. The predetermined rotor angle can be stored in the memory 130 and recalled when needed on initiation of start-up of the motor 10.

In some embodiments, the module 140 may comprise a rotor position and speed estimation module 140 of the modified FOC controller 200 of FIG. 11 and the initial rotor position determined in accordance with the invention may comprise an input to the module 140.

In some embodiments, the module 140 may comprise a rotor flux observer module 150 of a type as described in pages 1-3 of the publication entitled "improved Rotor Flux Observer for Sensorless Control of PMSM With Adaptive Harmonic Elimination and Phase Compensation" authored by Wei Xu et al, CES Transactions on Electrical Machines and Systems, vol. 3, no. 2, Jun. 2019, the content of which is herein incorporated by reference.

The closed-loop motor operating method according to the invention can be utilized in synchronous motors 10 with various stator winding configurations as illustrated by FIGS. 12-17.

Figure 12:
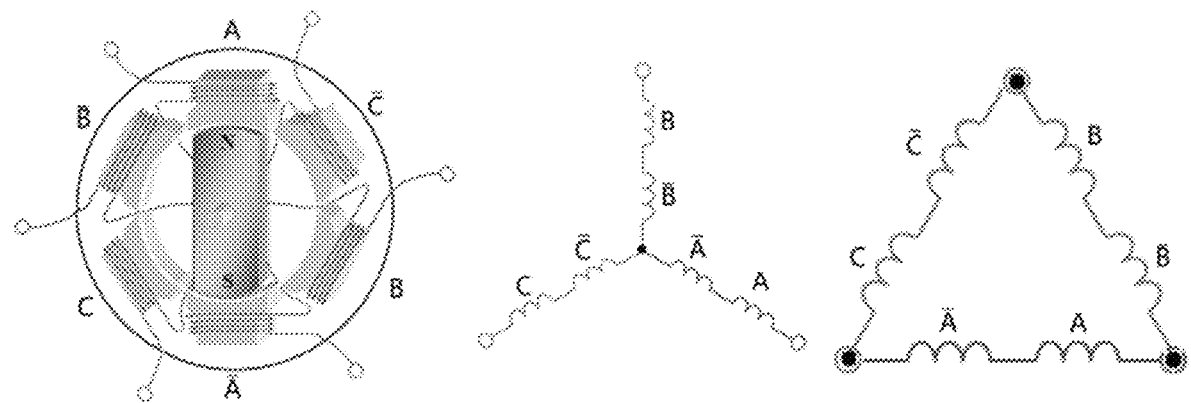
FIG. 12 is a schematic diagram showing the delta and star (or Y) stator windings configurations of a synchronous motor in which the closed-loop start-up method in accordance with the invention can be implemented.
Figure 13:
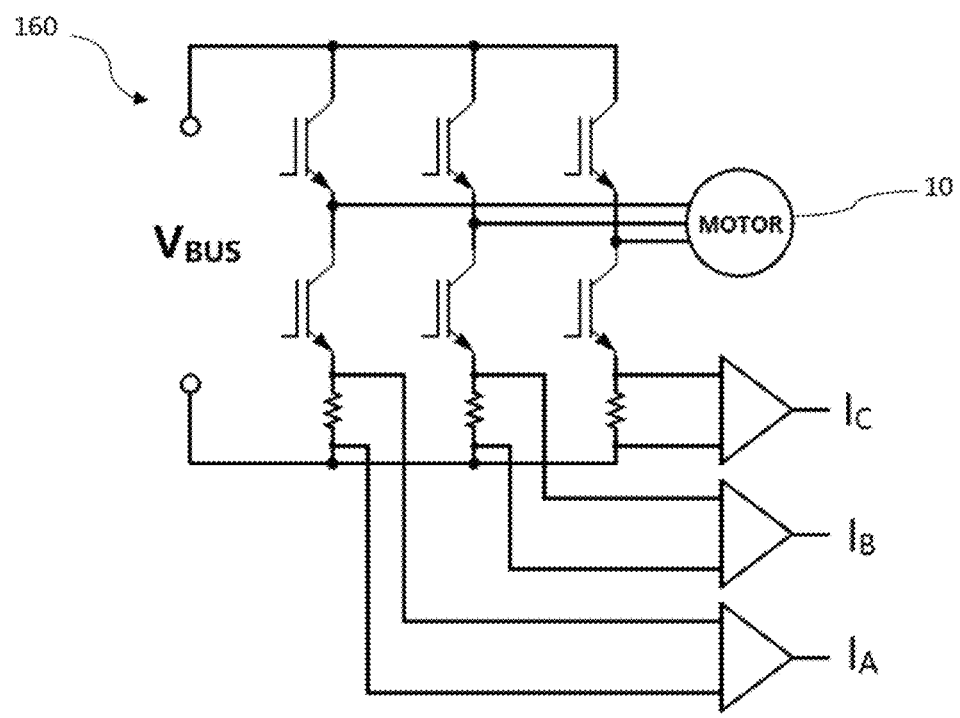
FIG. 13 is a schematic block diagram of a power stage for the closed-loop motor control system in accordance with the invention for the synchronous motor of FIG. 12.

FIG. 12 is a schematic diagram showing the conventional delta and star (or Y) stator windings configurations of the synchronous motor 10 whilst FIG. 13 provides a schematic block diagram of a 3-phase power stage/bridge 160 for the closed-loop controller 100/200 for the synchronous motor 10 of FIG. 13. Two or more of the outputs of the 3-phase bridge module 160 of the closed-loop controller 100/200 of FIG. 4 comprising two or more of the sensed currents denoted as "$I_A$", "$I_B$" and "$I_C$" in FIG. 13 are fed to the Clarke Transform module 170 of the closed-loop controller 100/200 for processing. Typically, the sensed currents "$I_A$", "$I_B$" are selected for the Clarke Transform module 170.

Figure 14:
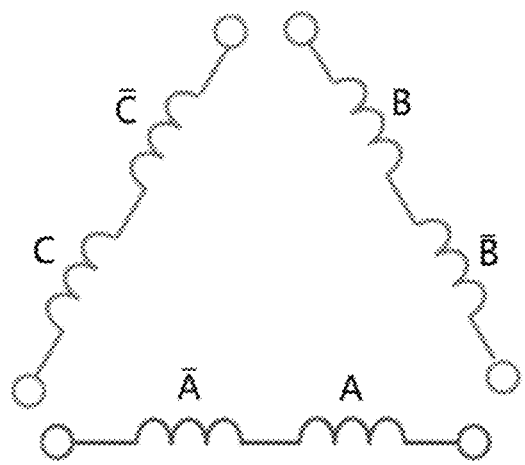
FIG. 14 is a schematic diagram showing a six-wire configuration of stator windings of a synchronous motor in which the closed-loop start-up method in accordance with the invention can be implemented.
Figure 15:
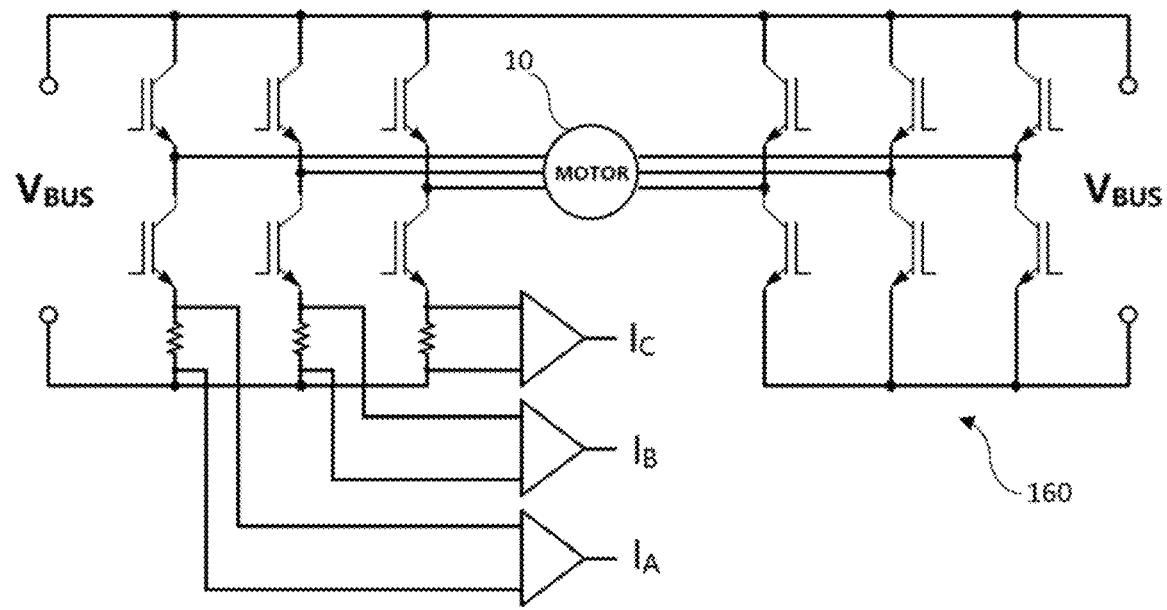
FIG. 15 is a schematic block diagram of a power stage for the closed-loop motor control system in accordance with the invention for the synchronous motor of FIG. 14.

In contrast to FIG. 12, FIG. 14 provides a schematic diagram showing a six-wire configuration of the stator windings 18 of the synchronous motor 10 whilst FIG. 15 provides a schematic block diagram of a 3-phase power stage/bridge 160 for the closed-loop controller 100/200 for the synchronous motor 10 with this stator winding configuration. The six-wire stator winding configuration results from none of the three stator windings 18 having any common connection points in contrast to the conventional delta or star stator winding configurations of FIG. 12 which have at least one common connection point between at east two of the stator windings 18.

Figure 17:
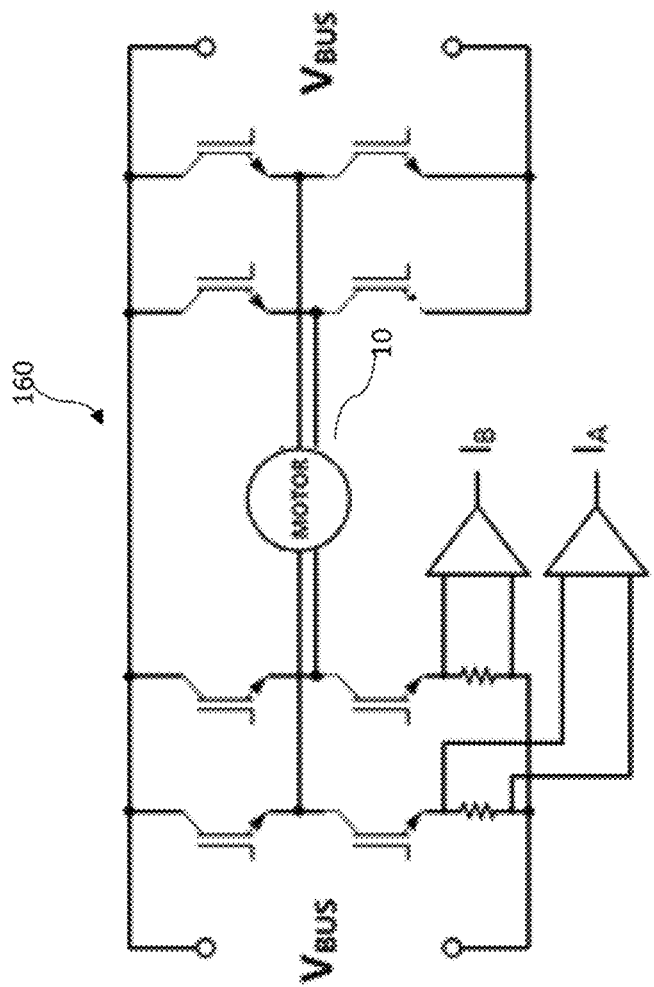
FIG. 17 is a schematic block diagram of a power stage for the closed-loop motor control system in accordance with the invention for the synchronous motor of FIG. 16.
Figure 16:
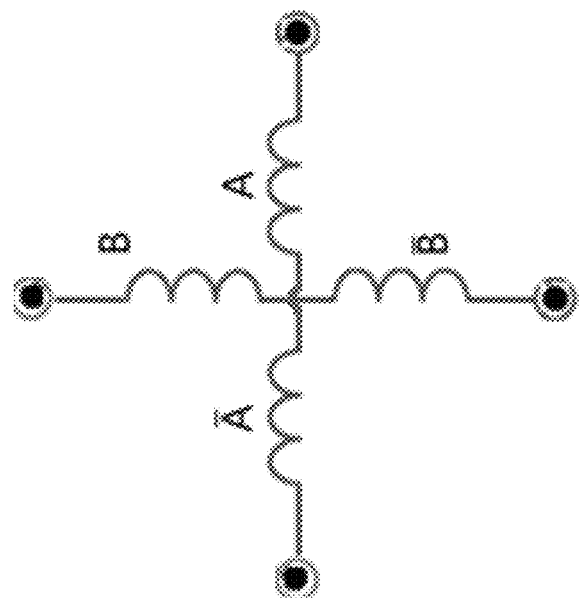
FIG. 16 is a schematic diagram showing a four-wire configuration of stator windings of a synchronous motor in which the closed-loop start-up method in accordance with the invention can be implemented.

FIG. 16 provides a schematic diagram showing a four-wire configuration of 2-phase stator windings 18 of the synchronous motor 10 in which the closed-loop start-up method in accordance with the invention can be implemented. FIG. 17 provides a schematic block diagram of a power stage/bridge 160 for the closed-loop motor controller 100/200 in which the sensed currents "$I_A$", "$I_B$" are fed in to the Clarke Transform module.

The invention also provides a closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to determine the initial rotor position of the synchronous motor in accordance with the invention. The closed-loop controller may be configured to switch-over control of the motor to a closed-loop synchronous operation motor control algorithm once the initial rotor position has been determined. The synchronous motor may be any of a brushless DC (BLDC) motor or a permanent magnet synchronous motor (PMSM).

The present invention also provides a non-transitory computer-readable medium storing machine-readable instructions, wherein, when the machine-readable instructions are executed by the processor of the closed-loop controller for the synchronous motor, they configure the processor to implement the concepts of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner, it can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of determining an initial rotor position on start-up of a synchronous motor having a permanent magnet rotor, the method comprising:
    applying at each of a plurality of pre-set motor angles of the synchronous motor a pair of voltage vector pulses, the pair of voltage vector pulses comprising a first pulse and a second pulse, each having the same amplitude but opposite polarities, the second voltage vector pulse being applied immediately or near immediately after the first voltage vector pulse is applied;
    determining the current responses to said pairs of applied voltage vector pulses at said plurality of pre-set motor angles; and
    (a) determining as the initial rotor position a stator angle corresponding to a pair of vector voltage pulses resulting in a largest sum of stator currents; or
    (b) determining as the initial rotor position a stator angle corresponding to a pair of vector voltage pulses where the sum of stator currents changes from a negative to a positive motor angle.

2. The method of claim 1, wherein, for step (a), the pairs of voltage vector pulses are applied to the vector d-axis.

3. The method of claim 1, wherein, for step (b), the pairs of voltage vector pulses are applied to the vector q-axis.

4. The method of claim 1, wherein the pairs of voltage vector pulses are applied sequentially to respective motor angles of the plurality of pre-set motor angles.

5. The method of claim 1, wherein the pairs of voltage vector pulses are applied to respective motor angles of the plurality of pre-set motor angles separated by 180°.

6. The method of claim 1, wherein the pairs of voltage vector pulses are selected to not cause saturation of the stator.

7. The method of claim 1, wherein the pair of opposite polarity voltage vector pulses are applied to the same motor angle.

8. A closed-loop method of starting a synchronous motor having a permanent magnet rotor, the method comprising the steps of:
    applying at each of a plurality of pre-set motor angles of the synchronous motor a pair of voltage vector pulses, the pair of voltage vector pulses comprising a first pulse and a second pulse, each having the same amplitude but opposite polarities, the second voltage vector pulse being applied immediately or near immediately after the first voltage vector pulse is applied;
    determining the current responses to said pairs of applied voltage vector pulses at said plurality of pre-set motor angles; and
    (a) determining as the initial rotor position a stator angle corresponding to a pair of vector voltage pulses resulting in a largest sum of stator currents; or
    (b) determining as the initial rotor position a stator angle corresponding to a pair of vector voltage pulses where the sum of stator currents changes from a negative to a positive motor angle;
    switching-over control of the motor to a closed-loop synchronous operation motor control algorithm once the initial rotor position has been determined.

9. The method of claim 8, wherein the closed-loop synchronous operation motor control algorithm comprises a sensorless closed-loop synchronous operation motor control algorithm.

10. The method of claim 8, wherein the closed loop synchronous operation motor control algorithm comprises a vector control algorithm.

11. The method of claim 10, wherein the vector control algorithm comprises a field-oriented control (FOC) algorithm.

12. The method of claim 8, wherein the step of determining the initial rotor position is performed by a module of any of a closed-loop synchronous operation motor control algorithm controller, a vector control algorithm controller, or a FOC algorithm controller.

13. The method of claim 8, wherein if, after switching-over control of the motor to the closed-loop synchronous operation motor control algorithm, it is determined that the motor is not operating synchronously then repeating the steps of determining the initial rotor position and, once the initial rotor position is re-determined, switching-over again to the closed-loop synchronous operation motor control.

14. The method of claim 8, wherein, when stopping the motor after switching-over control of the motor to the closed-loop synchronous operation motor control algorithm, the method includes parking the rotor at a predetermined rotor angle.

15. A closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to determine the initial rotor position of the synchronous motor by:
  applying at each of a plurality of pre-set motor angles of the synchronous motor a pair of voltage vector pulses, the pair of voltage vector pulses comprising a first pulse and a second pulse, each having the same amplitude but opposite polarities, the second voltage vector pulse being applied immediately or near immediately after the first voltage vector pulse is applied;
  determining the current responses to said pairs of applied voltage vector pulses at said plurality of pre-set motor angles; and
  (a) determining as the initial rotor position a stator angle corresponding to a pair of vector voltage pulses resulting in a largest sum of stator currents; or
  (b) determining as the initial rotor position a stator angle corresponding to a pair of vector voltage pulses where the sum of stator currents changes from a negative to a positive motor angle.

16. A closed-loop controller for a synchronous motor having a permanent magnet rotor, said controller comprising a non-transitory computer-readable medium storing machine-readable instructions and a processor, wherein, when the machine-readable instructions are executed by said processor, they configure the controller to start the synchronous motor by:
  applying at each of a plurality of pre-set motor angles of the synchronous motor a pair of voltage vector pulses, the pair of voltage vector pulses comprising a first pulse and a second pulse, each having the same amplitude but opposite polarities, the second voltage vector pulse being applied immediately or near immediately after the first voltage vector pulse is applied;
  determining the current responses to said pairs of applied voltage vector pulses at said plurality of pre-set motor angles; and
  (a) determining as the initial rotor position a stator angle corresponding to a pair of vector voltage pulses resulting in a largest sum of stator currents; or
  (b) determining as the initial rotor position a stator angle corresponding to a pair of vector voltage pulses where the sum of stator currents changes from a negative to a positive motor angle;
  switching-over control of the motor to a closed-loop synchronous operation motor control algorithm once the initial rotor position has been determined.

17. The closed-loop controller of claim 16, wherein the synchronous motor is any of a brushless DC (BLDC) motor or a permanent magnet synchronous motor (PMSM).

18. The closed-loop controller of claim 16, wherein the synchronous motor comprises a three-wire stator configuration, a four-wire stator configuration or a six-wire stator configuration.

* * * * *